(12) United States Patent
Liu et al.

(10) Patent No.: US 8,893,598 B2
(45) Date of Patent: Nov. 25, 2014

(54) LIQUID CRYSTAL SUBSTRATE CUTTING DEVICE AND CUTTING METHOD FOR LIQUID CRYSTAL SUBSTRATE

(75) Inventors: Zhen Liu, Shenzhen (CN); Ming Liu, Shenzhen (CN); Tao Ding, Shenzhen (CN); Hyojung Park, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 300 days.

(21) Appl. No.: 13/575,929

(22) PCT Filed: Jun. 28, 2012

(86) PCT No.: PCT/CN2012/077681
§ 371 (c)(1),
(2), (4) Date: Jul. 27, 2012

(87) PCT Pub. No.: WO2013/189095
PCT Pub. Date: Dec. 27, 2013

(65) Prior Publication Data
US 2013/0340583 A1 Dec. 26, 2013

(51) Int. Cl.
*B26D 7/10* (2006.01)
(52) U.S. Cl.
USPC .................................. 83/16; 83/170; 83/370
(58) Field of Classification Search
USPC ............................................ 83/370, 16, 170
See application file for complete search history.

(56) References Cited

U.S. PATENT DOCUMENTS

| | | | | |
|---|---|---|---|---|
| 4,343,209 A * | 8/1982 | Moelbert | ............................ | 83/16 |
| 4,406,198 A * | 9/1983 | Pechau et al. | ..................... | 83/170 |
| 4,467,168 A * | 8/1984 | Morgan et al. | ............ | 219/121.67 |
| 5,005,318 A * | 4/1991 | Shafir | ............................... | 451/70 |
| 5,303,861 A * | 4/1994 | Allaire et al. | ....................... | 225/2 |
| 5,548,429 A * | 8/1996 | Tsujita | ........................... | 349/187 |
| 5,776,220 A * | 7/1998 | Allaire et al. | .................... | 65/112 |
| 5,979,525 A * | 11/1999 | Durney | ......................... | 144/368 |
| 6,011,609 A * | 1/2000 | Kato et al. | ...................... | 349/190 |
| 6,023,039 A * | 2/2000 | Sawada | ..................... | 219/121.61 |
| 6,055,035 A * | 4/2000 | von Gutfeld et al. | .......... | 349/187 |
| 6,112,967 A * | 9/2000 | Ostendarp et al. | ............ | 225/93.5 |
| 6,257,224 B1 * | 7/2001 | Yoshino et al. | ............. | 125/13.01 |
| 6,326,225 B1 * | 12/2001 | Yamazaki et al. | ............... | 438/30 |
| 6,327,875 B1 * | 12/2001 | Allaire et al. | .................... | 65/103 |
| 6,407,360 B1 * | 6/2002 | Choo et al. | ............... | 219/121.67 |
| 6,413,150 B1 * | 7/2002 | Blair | ................................ | 451/41 |
| 6,420,678 B1 * | 7/2002 | Hoekstra | .................. | 219/121.75 |
| 6,423,930 B1 * | 7/2002 | Matsumoto | ............... | 219/121.69 |
| 6,489,588 B1 * | 12/2002 | Hoekstra et al. | .......... | 219/121.67 |
| 6,795,274 B1 * | 9/2004 | Hsieh et al. | ..................... | 360/135 |
| 7,609,358 B2 * | 10/2009 | Yamazaki et al. | ............. | 349/190 |

(Continued)

*Primary Examiner* — Sean Michalski
(74) *Attorney, Agent, or Firm* — Andrew C. Cheng

(57) ABSTRACT

The present invention provides a liquid crystal substrate cutting device used for cutting a liquid crystal substrate along a cutting line, and the liquid crystal substrate cutting device comprises a heating unit and a cutter unit. The heating unit moves along the cutting line and heats the liquid crystal substrate to soften a sealant covered on the cutting line, and the cutter unit moves along the cutting line to further cut the liquid crystal substrate. The present invention comprises the heating unit for heating the liquid crystal substrate along the cutting line to soften the sealant covered on the cutting line such that the cutter unit can precisely cut the liquid crystal substrate without abnormity of the feeding distance of the cutter unit which cause the liquid crystal substrate to break. Therefore, the scrap-rate is reduced.

14 Claims, 2 Drawing Sheets

--- detecting the cutting line if it is covered with the sealant by using the optical detector unit to move along the cutting line, and using the control system according to a detection result to turn on the heating unit or turn off the heating unit. —— S31

↓ heating the liquid crystal substrate by moving the heating unit along the cutting line so that the sealant covered on the cutting line is softening. —— S32

↓ cutting the liquid crystal substrate by further moving the cutter unit along the cutting line. —— S33

(56) References Cited

U.S. PATENT DOCUMENTS

| | | | |
|---|---|---|---|
| 7,732,730 B2* | 6/2010 | Fukuyo et al. | 219/121.65 |
| 7,812,281 B2* | 10/2010 | Acker et al. | 219/121.69 |
| 8,444,906 B2* | 5/2013 | Lee et al. | 264/400 |
| 8,584,490 B2* | 11/2013 | Garner et al. | 65/112 |
| 8,671,813 B2* | 3/2014 | Tannas | 83/880 |
| 8,673,745 B2* | 3/2014 | Fukuyo et al. | 438/463 |
| 8,720,228 B2* | 5/2014 | Li | 65/97 |
| 2001/0007216 A1* | 7/2001 | Demarest et al. | 83/16 |
| 2007/0204734 A1* | 9/2007 | Ito et al. | 83/170 |
| 2010/0107848 A1* | 5/2010 | Joseph et al. | 83/862 |
| 2011/0194053 A1* | 8/2011 | Tannas | 349/96 |
| 2011/0226832 A1* | 9/2011 | Bayne et al. | 225/2 |
| 2012/0064603 A1* | 3/2012 | Childs et al. | 435/235.1 |
| 2012/0111161 A1* | 5/2012 | Kuriki et al. | 83/16 |
| 2013/0292442 A1* | 11/2013 | Bayne et al. | 225/2 |
| 2013/0337990 A1* | 12/2013 | French et al. | 493/352 |
| 2013/0340583 A1* | 12/2013 | Liu et al. | 83/16 |
| 2014/0179190 A1* | 6/2014 | Lee et al. | 445/24 |

* cited by examiner

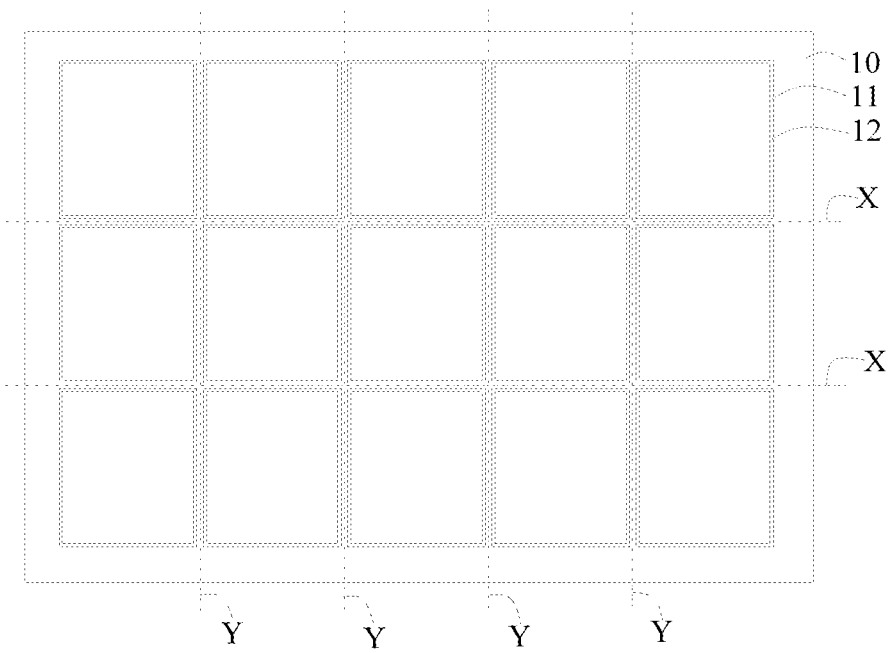

Fig.3

| heating liquid crystal substrate by moving the heating unit along the cutting line to soften the sealant covered on the cutting line. | S21 |

| cutting the liquid crystal substrate by further moving the cutter unit along the cutting line. | S22 |

Fig.4

| detecting the cutting line if it is covered with the sealant by using the optical detector unit to move along the cutting line, and using the control system according to a detection result to turn on the heating unit or turn off the heating unit. | S31 |

| heating the liquid crystal substrate by moving the heating unit along the cutting line so that the sealant covered on the cutting line is softening. | S32 |

| cutting the liquid crystal substrate by further moving the cutter unit along the cutting line. | S33 |

Fig.5

LIQUID CRYSTAL SUBSTRATE CUTTING DEVICE AND CUTTING METHOD FOR LIQUID CRYSTAL SUBSTRATE

BACKGROUND OF THE INVENTION

1. Field of the Invention

The present invention relates to a liquid crystal substrate cutting device and a cutting method for a liquid crystal substrate, and more particularly, to a liquid crystal substrate cutting device and a cutting method for a liquid crystal substrate in flat panel display manufacturing field.

2. Description of Related Art

In the manufacturing process of flat panel display device, it includes ODF (one drop filling, liquid crystal injection process) process and the cutting process for the liquid crystal substrate immediately after the ODF process. Wherein, the ODF process includes the step of forming multiple seal frames sealed by coating a sealant and the step of curing the sealant. The liquid crystal substrate cutting process usually requires the cutting device to cut the large-size liquid crystal substrate with the cured seal frames into multiple small-size liquid crystal substrates along a predetermined cutting line. Under normal situation, the number of the small-size liquid crystal substrates by cutting is equal to the number of the seal frames on the large-size liquid crystal substrate. In order to save costs and improve the utilization of the liquid crystal substrate, the distance between two adjacent seal frames must be as small as possible.

The cutting device in the conventional liquid crystal substrate cutting process generally uses a cutter wheel module. The cutter wheel could provide higher cutting precision in cutting the large-size liquid crystal substrate. However, if the seal opening is thicker or the injection speed is higher in the coating step of the sealant, the width of the seal frame may be large enough to reach or exceed the cutting line. Because the coating step of the sealant such as a continuous coating process of the adjacent seal frames or difficult to control the quantity of the sealant at the corner location, it appears a phenomenon that the adjacent seal frames adhere each other. The cutting line will pass through the adhesion area. When the cutter wheel module touches the sealant of the seal frames in cutting the liquid crystal module along the cutting line, it easily occur cutting abnormity of the cutting line deviation or breaking of the liquid crystal substrate so that the product is broken.

SUMMARY OF THE INVENTION

The main technical problem solved by the present invention is to provide a liquid crystal substrate cutting device and a cutting method for the liquid crystal substrate to reduce the scrap-rate of the products.

To solve the above problems, a technical solution used in this invention is to provide a liquid crystal substrate cutting device used for cutting a liquid crystal substrate along a cutting line comprising:

a heating unit, and the heating temperature range of the heating unit is from 120 Celsius degree to 150 Celsius degree;

a cutter unit;

an optical detector unit detecting if the cutting line is covered with a sealant along the cutting line; and a control system further turning on or turning off the heating unit according to a detection result of the optical detector unit;

wherein, the heating unit moves along the cutting line and heats the liquid crystal substrate to soften the sealant covered on the cutting line and the cutter unit moves along the cutting line to further cut the liquid crystal substrate.

Wherein, when the optical detector unit detects that the cutting line is covered with the sealant, the control system turns on the heating unit, and the heating unit further heats the sealant along the cutting, and when the optical detector unit detects that the cutting line is not covered with the sealant, the control system turns off the heating unit, and the heating unit does not heat the cutting line not covered with the sealant.

Wherein, the liquid crystal substrate cutting device further includes a base, and the base moves along the cutting line, and the optical detector unit, the heating unit, and the cutter unit are all fixed to the base, and the heating unit is located between the optical detector unit and the cutter unit.

Wherein, the heating unit is a laser heating element, an electric heating element, an infrared heating element, or a magnetic heating element, or a combination thereof.

To solve the above problems, another technical solution used in this invention is to provide a liquid crystal substrate cutting device used for cutting a liquid crystal substrate along a cutting line comprising:

a heating unit; and a cutter unit;

wherein, the heating unit moves along the cutting line and heats the liquid crystal substrate to soften a sealant covered on the cutting line, and the cutter unit moves along the cutting line to further cut the liquid crystal substrate.

Wherein, the liquid crystal substrate cutting device further includes an optical detector unit and a control system, wherein the optical detector unit detects if the cutting line is covered with the sealant along the cutting line and the control system further turns on or turns off the heating unit according to a detection result of the optical detector unit.

Wherein, when the optical detector unit detects that the cutting line is covered with the sealant, the control system turns on the heating unit, and the heating unit further heats the sealant along the cutting, and when the optical detector unit detects that the cutting line is not covered with the sealant, the control system turns off the heating unit, and the heating unit does not heat the cutting line not covered with the sealant.

Wherein, the liquid crystal substrate cutting device further includes a base, and the base moves along the cutting line, and the optical detector unit, the heating unit, and the cutter unit are all fixed to the base, and the heating unit is located between the optical detector unit and the cutter unit.

Wherein, the heating temperature range of the heating unit is from 120 Celsius degree to 150 Celsius degree.

Wherein, the heating unit is a laser heating element, an electric heating element, an infrared heating element, or a magnetic heating element, or a combination thereof.

To solve the above problems, another technical solution used in this invention is to provide a cutting method for cutting a liquid crystal substrate comprising:

heating the liquid crystal substrate by moving a heating unit along a cutting line to soften a sealant covered on the cutting line; and cutting the liquid crystal substrate by further moving a cutter unit along the cutting line.

Wherein, further comprising, before the step of heating the liquid crystal substrate by moving the heating unit along the cutting line to soften the sealant covered on the cutting line, the step of detecting the cutting line if it is covered with the sealant by using an optical detector unit to move along the cutting line, and using a control system according to a detection result to turn on the heating unit or turn off the heating unit.

Wherein, in the step of detecting the cutting line if it is covered with the sealant by using the optical detector unit to move along the cutting line, and using the control system according to the detection result to turn on the heating unit or turn off the heating unit, when the optical detector unit detects that the cutting line is covered with the sealant, the control system turns on the heating unit, and when the optical detector unit detects that the cutting line is not covered with the sealant, the control system turns off the heating unit.

Wherein, the heating temperature range of the heating unit is from 120 Celsius degree to 150 Celsius degree.

The beneficial effects of the present invention are: the liquid crystal substrate cutting device of the present invention comprises the heating unit for heating the liquid crystal substrate along the cutting line to soften the sealant covered on the cutting line such that the cutter unit can precisely cut the liquid crystal substrate without abnormity of the feeding distance of the cutter unit which cause the liquid crystal substrate to break. Therefore, the scrap-rate is reduced.

BRIEF DESCRIPTION OF THE DRAWINGS

FIG. 3 is a schematic view of the LCD substrate coated with a plurality of sealants;

FIG. 4 is a flow chart of the first embodiment of the cutting method for the liquid crystal substrate;

FIG. 5 is a flow chart of the second embodiment of the cutting method for the liquid crystal substrate.

DETAILED DESCRIPTION OF THE PREFERRED EMBODIMENT

The following combines figures and embodiments for detailed description of the present invention.

Figure 1:
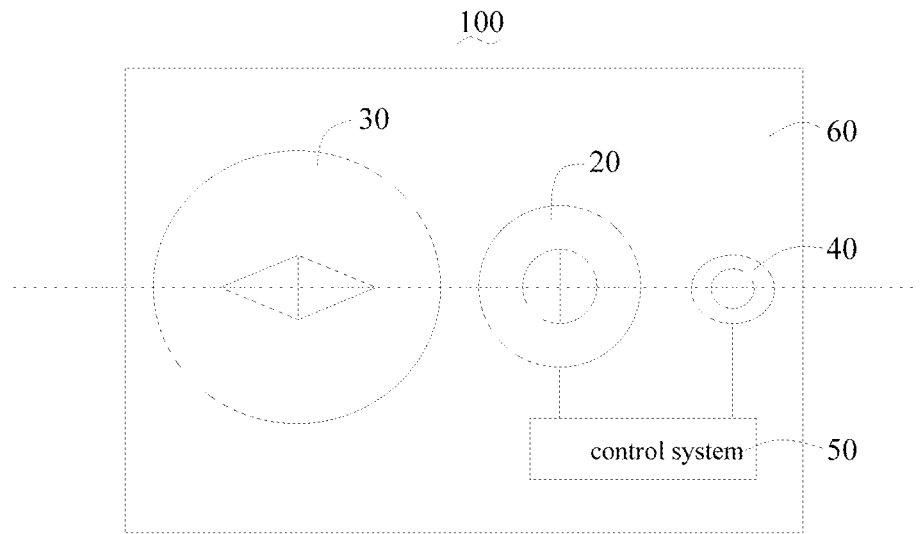
FIG. 1 is a bottom view of the cutting device of the liquid crystal substrate of the present invention.
Figure 2:
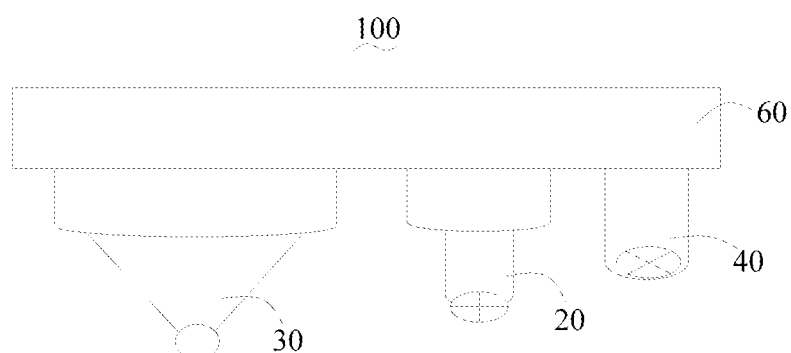
FIG. 2 is a front view of the cutting device of the liquid crystal substrate in FIG. 1.

Please refer to FIG. 1 to FIG. 3. A liquid crystal substrate cutting device 100 is used for cutting the liquid crystal substrate 10 along a cutting line X or Y. A plurality of cured seal frames 11 formed by a sealant 12 are disposed on the liquid crystal substrate 10. The cutting line X and Y are located between adjacent columns and adjacent rows of the seal frames 11.

The liquid crystal substrate cutting device 100 includes a heating unit 20 and a cutter unit 30.

The heating unit 20 heats the liquid crystal substrate 10 along the cutting line X or the cutting line Y. The cutter unit 30 further cuts liquid crystal substrate 10 along the cutting line X or the cutting line Y. If the cutting line X or the cutting line Y is covered with the sealant 12, the heating by the heat unit 20 soften the sealant 12 such that the adhesion of the soften sealant 12 is greatly reduced for smoothly cutting the liquid crystal substrate 10.

In this embodiment, the liquid crystal substrate cutting device 100 further includes an optical detector unit 40 and a control system 50. The optical detector unit 40 detects if the cutting line X or Y is covered with the sealant 12 along the cutting line X or Y. The control system 50 further turns on or turns off the heating unit 20 according to a detection result of the optical detector unit 40.

Specifically, when the optical detector unit 40 detects that the cutting line X or Y is covered with the sealant 12, the control system 50 turns on the heating unit 20. The heating unit 20 further heats the cutting line X or Y covered with the sealant 12.

When the optical detector unit 40 detects that the cutting line X or Y is not covered with the sealant 12, the control system 50 turns off the heating unit 20. The heating unit 20 does not heat the cutting line X or Y not covered with the sealant 12.

The heating unit 20 is turned on or turned off accordingly so that it can save energy at the same time when cutting the liquid crystal substrate 10 smoothly.

In this embodiment, the liquid crystal substrate cutting device 100 further includes a base 60. The base 60 moves along the cutting line X or Y. The optical detector unit 40, the heating unit 20, and the cutter unit 30 are all fixed to the base 60. And the heating unit 20 is located between the optical detector unit 40 and cutter unit 30.

Because the optical detector unit 40, the heating unit 20, and the cutter unit 30 are fixed to the base 60, the three move synchronously with the same speed. In practical applications, the center of the detection part (not shown) of the optical detector unit 40, the center of heating part (not shown) heating unit 20, and the center of the cutter part (not shown) of the cutter unit 30 are located in the same straight line. When the base 60 is moving along the cutting line X or Y, the center of the detection part, the heating part, and the cutter part are moving orderly along the cutting line X or Y to achieve detection, heating, and cutting for the cutting line X or Y.

After numerous tests proved that when the sealant 12 is heated to 120 Celsius degree to 150 Celsius degree, it will become soft and it's adhesion is greatly reduced. And the liquid crystal substrate 10 does not produce deformation or other quality mutation in that temperature range. Therefore, preferably, the heating temperature range of the heating unit 20 is from 120 Celsius degree to 150 Celsius degree.

The present invention does not limit the heating ways of the heating unit 20. All heating ways that can soften the sealant 12 are in the scope of the present invention. For example, the heating unit 20 can be a laser heating element, an electric heating element, an infrared heating element, or a magnetic heating element, or a combination thereof.

The present invention further provides a cutting method for a liquid crystal substrate for cutting a liquid crystal substrate along a cutting line X or Y. Please refer to FIG. 4, the first embodiment of the cutting method for the liquid crystal substrate includes the following steps:

S21, heating liquid crystal substrate 10 by moving the heating unit 20 along the cutting line to soften the sealant 12 covered on the cutting line.

Specifically, in this step, the heating unit 20 moves along the cutting line X or Y and heats the liquid crystal substrate 10. When the cutting line X or Y of the liquid crystal substrate 10 is covered with the sealant 12, the sealant 12 is softening by the heating unit 20, helpful for the cutting step of the liquid crystal substrate 10.

After numerous tests proved that when the sealant 12 is heated to 120 Celsius degree to 150 Celsius degree, it will become soft and it's adhesion is greatly reduced. And the liquid crystal substrate 10 does not produce deformation or other quality mutation in that temperature range. Therefore, preferably, the heating temperature range of the heating unit 20 is from 120 Celsius degree to 150 Celsius degree.

S22, cutting the liquid crystal substrate 10 by further moving the cutter unit 30 along the cutting line.

In this step, the cutter unit 30 cuts the liquid crystal substrate 10 by moving along the heated cutting line X or Y. The sealant 12 covered on the cutting line X or Y has been heated to be soften so that the cutting step is guaranteed.

Please refer to FIG. 5, the second embodiment of the cutting method for the liquid crystal substrate includes the following steps:

S31, detecting the cutting line if it is covered with the sealant by using the optical detector unit to move along the cutting line, and using the control system according to a detection result to turn on the heating unit or turn off the heating unit.

S32, heating the liquid crystal substrate by moving the heating unit along the cutting line so that the sealant covered on the cutting line is softening.

Specifically, when the optical detector unit 40 detects that the cutting line X or Y is covered with the sealant 12, the control system 50 turns on the heating unit 20, and the heating unit 20 further heats the cutting line X or Y covered with the sealant 12. When the optical detector unit 40 detects that the cutting line X or Y is not covered with the sealant 12, the control system 50 turns off the heating unit 20, and the heating unit 20 does not heat the cutting line X or Y not covered with the sealant 12.

S33, cutting the liquid crystal substrate by further moving the cutter unit along the cutting line.

The beneficial effects of the present invention are: the liquid crystal substrate cutting device 100 of the present invention comprises the heating unit 20 for heating the liquid crystal substrate 10 along the cutting line X or Y to soften the sealant 12 covered on the cutting line X or Y such that the cutter unit 30 can precisely cut the liquid crystal substrate 10 without abnormity of the feeding distance of the cutter unit 30 which cause the liquid crystal substrate 10 to break. Therefore, the scrap-rate is reduced.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal substrate cutting device used for cutting a liquid crystal substrate along a cutting line comprising:
   a heating unit, and the heating temperature range of the heating unit is from 120 Celsius degree to 150 Celsius degree;
   a cutter unit;
   an optical detector unit detecting if the cutting line is covered with a sealant along the cutting line; and
   a control system further turning on or turning off the heating unit according to a detection result of the optical detector unit;
   wherein, the heating unit moves along the cutting line and heats the liquid crystal substrate to soften the sealant covered on the cutting line and the cutter unit moves along the cutting line to further cut the liquid crystal substrate.

2. The liquid crystal substrate cutting device according to claim 1, wherein when the optical detector unit detects that the cutting line is covered with the sealant, the control system turns on the heating unit, and the heating unit further heats the sealant along the cutting, and when the optical detector unit detects that the cutting line is not covered with the sealant, the control system turns off the heating unit, and the heating unit does not heat the cutting line not covered with the sealant.

3. The liquid crystal substrate cutting device according to claim 1, wherein the liquid crystal substrate cutting device further includes a base, and the base moves along the cutting line, and the optical detector unit, the heating unit, and the cutter unit are all fixed to the base, and the heating unit is located between the optical detector unit and the cutter unit.

4. The liquid crystal substrate cutting device according to claim 1, wherein the heating unit is a laser heating element, an electric heating element, an infrared heating element, or a magnetic heating element, or a combination thereof.

5. A liquid crystal substrate cutting device used for cutting a liquid crystal substrate along a cutting line comprising:
   a heating unit; and a sensing unit for sensing the presence of sealant over the cutting line;
   a cutter unit;
   a control system for controlling the heating unit and the cutter unit
   wherein, the heating unit moves along the cutting line and heats the liquid crystal substrate to soften a sealant covered on the cutting line, and the cutter unit moves along the cutting line to further cut the liquid crystal substrate.

6. The liquid crystal substrate cutting device according to claim 5, wherein the sensing unit further includes an optical detector unit, wherein the optical detector unit detects if the cutting line is covered with the sealant along the cutting line and the control system further turns on or turns off the heating unit according to a detection result of the optical detector unit.

7. The liquid crystal substrate cutting device according to claim 6, wherein when the optical detector unit detects that the cutting line is covered with the sealant, the control system turns on the heating unit, and the heating unit further heats the sealant along the cutting, and when the optical detector unit detects that the cutting line is not covered with the sealant, the control system turns off the heating unit, and the heating unit does not heat the cutting line not covered with the sealant.

8. The liquid crystal substrate cutting device according to claim 6, wherein the liquid crystal substrate cutting device further includes a base, and the base moves along the cutting line, and the optical detector unit, the heating unit, and the cutter unit are all fixed to the base, and the heating unit is located between the optical detector unit and the cutter unit.

9. The liquid crystal substrate cutting device according to claim 5, wherein the heating temperature range of the heating unit is from 120 Celsius degree to 150 Celsius degree.

10. The liquid crystal substrate cutting device according to claim 5, wherein the heating unit is a laser heating element, an electric heating element, an infrared heating element, or a magnetic heating element, or a combination thereof.

11. A cutting method for cutting a liquid crystal substrate comprising:
    sensing the cutting line to determine the presence of sealant, and controlling a heating unit and a cutting unit with a control unit by heating the liquid crystal substrate by moving the heating unit along a cutting line to soften a sealant covered on the cutting line; and
    cutting the liquid crystal substrate by further moving the cutter unit along the cutting line.

12. The cutting method for cutting the liquid crystal substrate according to claim 11 further comprising, before the step of heating the liquid crystal substrate by moving the heating unit along the cutting line to soften the sealant covered on the cutting line, the step of detecting the cutting line if it is covered with the sealant by using an optical detector unit to move along the cutting line, and using a control system according to a detection result to turn on the heating unit or turn off the heating unit.

13. The cutting method for cutting the liquid crystal substrate according to claim 12, wherein, in the step of detecting the cutting line if it is covered with the sealant by using the optical detector unit to move along the cutting line, and using the control system according to the detection result to turn on the heating unit or turn off the heating unit, when the optical detector unit detects that the cutting line is covered with the sealant, the control system turns on the heating unit, and when the optical detector unit detects that the cutting line is not covered with the sealant, the control system turns off the heating unit.

14. The cutting method for cutting the liquid crystal substrate according to claim 11, wherein the heating temperature range of the heating unit is from 120 Celsius degree to 150 Celsius degree.

* * * * *